United States Patent
Cornick

(10) Patent No.: US 6,261,446 B1
(45) Date of Patent: Jul. 17, 2001

(54) PRELOADER SYSTEM FOR SEPARATING SEWAGE MATERIALS

(75) Inventor: James J. Cornick, Kapolei, HI (US)

(73) Assignee: CMY Associates, LLC, Waianae, HI (US)

( * ) Notice: Subject to any disclaimer, the term of this patent is extended or adjusted under 35 U.S.C. 154(b) by 0 days.

(21) Appl. No.: 09/302,841

(22) Filed: Apr. 30, 1999

(51) Int. Cl.[7] ............ B01D 17/032; B01D 21/28
(52) U.S. Cl. ............ 210/173; 210/86; 210/96.1; 210/104; 210/197; 210/320; 210/532.2; 210/523
(58) Field of Search ............ 210/803, 85, 86, 210/96.1, 97, 103, 104, 170, 173, 197, 320, 523, 532.2, 533, 532.1, 920, 921, 130, 802; 241/DIG. 38, 46.01, 97; 137/546, 118.01, 115.13, 561, 115.01, 207

(56) References Cited

U.S. PATENT DOCUMENTS

| | | |
|---|---|---|
| 1,902,171 | 3/1933 | Kopp . |
| 2,467,021 * | 4/1949 | Fischer . |
| 2,822,927 | 2/1958 | Burdette . |
| 2,982,414 | 5/1961 | Hirshstein et al. . |
| 3,731,802 | 5/1973 | James . |
| 3,824,632 | 7/1974 | Bach et al. . |
| 3,957,633 * | 5/1976 | Gatti et al. . |
| 3,957,642 * | 5/1976 | Oldham et al. . |
| 4,406,794 * | 9/1983 | Brigante . |
| 4,904,387 * | 2/1990 | Jordan . |
| 4,940,539 * | 7/1990 | Weber . |
| 5,006,232 * | 4/1991 | Lidgitt et al. . |
| 5,178,754 | 1/1993 | Batten et al. . |
| 5,225,085 | 7/1993 | Napier et al. . |
| 5,254,267 | 10/1993 | Deskins et al. . |
| 5,307,697 * | 5/1994 | Davis et al. . |
| 5,360,555 | 11/1994 | Batten . |
| 5,433,842 * | 7/1995 | Morris et al. . |
| 5,505,860 | 4/1996 | Sager . |
| 5,543,064 | 8/1996 | Batten . |

FOREIGN PATENT DOCUMENTS

| | | |
|---|---|---|
| 8913937 | 2/1990 | (DE) . |
| 196 04 446 | 8/1997 | (DE) . |
| 0 282 906 | 9/1988 | (EP) . |
| 2 228 751 | 9/1990 | (GB) . |

* cited by examiner

Primary Examiner—Joseph W. Drodge
Assistant Examiner—Terry K. Cecil
(74) Attorney, Agent, or Firm—Fitzpatrick, Cella, Harper & Scinto

(57) ABSTRACT

A system is described for improving separation of sewage containing wastewater, oleaginous materials and solids. The system includes a tank 10 having a first chamber 12 and a second chamber 14. In the first chamber oleaginous materials rise to an upper portion thereof and a grinder pump 30 grinds the solids that descend toward the bottom of the first chamber. The second chamber in communication with the first chamber delivers the sewage to a discharge line 24 in communication with a transport line that leads to a downstream sewage treatment plant. A conduit 32 conducts the slurry of the ground solids from the first chamber to the discharge line. A pressure relief line 40 running from the conduit releases the head pressure into the first chamber. The pressure relief line is connected to the conduit downstream of the conduit's highest point of elevation. A spray system pumps wastewater from the second chamber to above the oleaginous layer floating in the first chamber in order to dislodge solids entrained in the oleaginous layer. A system of probes monitor the level of materials in the first chamber to control the activation of the grinding pump. When the discharge line or the public sewer line becomes backed up, the pressure relief line allows the slurry of solids to be discharged back into the tank rather than being forced downstream towards the blockage, increasing the pressure in the line.

33 Claims, 2 Drawing Sheets

PRELOADER SYSTEM FOR SEPARATING SEWAGE MATERIALS

BACKGROUND OF THE INVENTION

The present invention relates to an improved sewage separation system. Specifically, the invention involves an improved preloader tank for separating waste materials collected from restaurants, hotels, condominium complexes or the like that produce mixed sewage, including waste water, oleaginous materials and solids, in a common line.

Some buildings drain all of their sewage into common lines that feed to public sewers. This causes oleaginous materials (grease and oil), common in kitchen waste, to be mixed with human waste. Most sewage treatment plants are not intended to handle oleaginous materials. In addition, the oleaginous materials may cause build-ups in the lines leading to the treatment plants, which could result in blockages. Accordingly, it is preferable, and many local codes require, that any sewage draining into public sewer lines not contain any significant concentration of oleaginous materials.

Oleaginous waste usually may be disposed of at public dumps. However, for public health and safety reasons, it is not permissible to dispose of human waste at public dump sites. Therefore, oleaginous materials often must be removed from the rest of the sewage before it is discharged into public sewer lines and processed at sewage treatment plants.

It is also useful to grind solid waste material before discharging it into public sewer lines. In this way the solids will be less likely to lodge in the lines and cause blockages downstream.

There are preloader tanks known in the art for separating the contents of raw sewage, to some degree, into oleaginous materials, waste water, and solids, examples of which are shown in U.S. Pat. Nos. 5,360,555, 5,543,064, 4,940,539, 5,254,267 and 5,505,860.

U.S Pat. No. 5,360,555 (Batten '555) shows a typical design of a tank for separating waste materials as discussed above, although the tank in Batten '555 is of limited size and specifically intended to handle sewage from kitchens only. Batten '555 discloses a separator tank that uses first and second chambers to separate waste water, oleaginous materials and solids. The first chamber has a sloped bottom leading to an outlet attached to a grinder, such as a garbage disposal, for the removal of solids. The first chamber is separated from the second chamber by a weir and a first baffle. Water and oleaginous materials flow over the weir and under the first baffle to reach the second chamber. A screen prevents the movement of solids into the second chamber. The second chamber includes an oleophilic disk for removing oleaginous materials from the surface of the water and a second baffle under which water flows to reach a discharge line. The ground solids from the grinder are pumped to the discharge line and remixed with the waste water.

U.S. Pat. No. 5,543,064 (Batten '064) shows a similar, but much larger, tank than the one shown in Batten '555. Specifically, the Batten '064 patent discloses a sewage lift station. Lift stations are tanks attached to public sewer lines that pump sewage to a higher elevation so that the sewage may flow by the force of gravity through the sewage line to the treatment plant. Batten '064 discloses a lift station that includes a solids separation chamber, a separation chamber for oleaginous materials, and a sewage lift chamber. The solids separation chamber, which is separated from the separation chamber for oleaginous materials by a wall, includes an inlet, screen and pump. Once waste materials enter the solids separation chamber through the inlet, solids are prevented by the screen from spilling over the wall and are pumped into the sewage lift chamber by the pump. Oleaginous materials and water flow over the wall into the separation chamber for oleaginous materials, where a skimmer removes the oleaginous materials and a water conduit allows the water to flow into the sewage lift chamber. A pump pumps the water and solids from the sewage lift chamber to the higher elevation.

These known separation systems have a number of drawbacks that can cause problems downstream at the sewage treatment plants. Particularly in growing communities, the sewage treatment plants must deal with increasing amounts of sewage. If the load at the treatment plant becomes too great, bacterial colonies used to process the sewage become overworked, and hence cannot handle the volume of sewage. This causes a greater retention time of the sewage at the treatment plant. Additionally, the bacterial colonies are disturbed by turbulence when sewage enters the treatment plant with too much force or velocity. The treatment plants are designed to handle sewage that moves through the lines with only the flow pressure caused by gravity.

These downstream problems are often caused or exacerbated by the use of separation (preloader) tanks like those discussed above. Generally, the pumps in these tanks activate when the tanks fill with sewage, which occurs most often at peak usage times during the day, usually in the mornings and afternoons. Accordingly, many of these systems can activate at the same times each day. This can cause surges in the volume of sewage reaching sewage treatment plants during the peak times. The bacterial colonies at the treatment plant work more efficiently if they receive a relatively steady source (flow rate) of nutrients, rather than surges. Also, the flow pressure generated by the pumps can propagate through the sewer lines to the treatment plants, causing unwanted turbulence. The present invention alleviates these and other problems associated with known preloader systems.

The sewage separation system of the present invention is an improvement upon those systems that comprise the following elements or features: a chamber for receiving sewage containing water, oleaginous materials and solids, in which at least a portion of the solids can settle to the bottom of the chamber and a portion of the oleaginous materials can rise to the top of the water; a discharge line for passing the sewage from the sewage separation system into a transport line that leads to a sewage treatment plant; means for grinding at least a portion of the solids that settle to the bottom of the chamber; a conduit for conducting a slurry of the ground solids in water from the chamber to the discharge line; and means for preventing at least a portion of the oleaginous materials that enter the system from entering the discharge line.

In the present invention such a system is provided with a pressure relief line running from the conduit through which the slurry of ground solids is conducted from the chamber to the discharge line. The pressure relief line is in communication with the sewage-receiving chamber, so as to allow head pressure in the conduit to be released into that chamber. By virtue of the inclusion of the pressure relief line, excess flow pressure can be released back into the system before the sewage reaches the transport line.

DETAILED DESCRIPTION OF THE INVENTION

The separation system of the present invention may primarily include a tank for receiving sewage from a restaurant, hotel, apartment complex or other building. An inlet pipe or other conduit may provide a flow of sewage into the tank from the various waste sources within the building (or buildings) to which it is connected. The inlet pipe may extend through an opening in one side of the tank, and may be positioned in a substantially horizontal position at its entrance point. Inside the tank, the horizontal portion of the pipe may open directly into the tank, but preferably forms a T-shape by connecting to a substantially vertical portion of pipe, at an intermediate point of the latter. The vertical portion of the pipe may contain openings at the top and bottom thereof. Being thus constructed, the inlet pipe can handle surges in head pressure that would normally cause stress to the pipes (especially if a downwardly-turned, L-shaped pipe were to be used) and turbulence in the chamber. Surges can flow both up and down the vertical portion of the pipe, allowing a greater total cross-sectional area in which the surges may dissipate.

The inlet pipe preferably passes through the opening in the tank at a height in the range of about 4 to 8 feet from the floor of the tank (which may be, for example, about $2/3$ to $3/4$ of the total height of the tank). The opening at the bottom of the vertical portion of the inlet pipe may be, for example, at a height from the floor of the tank in the range of about 1 to 1.5 ft. The top opening of the vertical portion of the inlet pipe is preferably located at a distance in the range of about 1 to 3 in. from the ceiling of the tank.

The size of the inlet pipe should be determined in accordance with local codes concerning sewage lines. However, the cross-sectional area of the pipe may often be in the range of about 50 to 450 in.$^2$ The thickness of the piping should also comply with local regulations, but often may be in the range from about SDR 35 to about SDR 40 schedule piping. The piping may be made of metal, concrete, or plastic, but is preferably PVC (polyvinyl chloride) piping.

The tank itself may vary in size, depending on the size of the load it is intended to accommodate. Generally, the size of the tank may be in the range from about 3,000 to about 20,000 gallons. The approximate dimensions of a 3,000 gallon tank may be, for example, 16 ft. long by 8 ft. wide by 8 ft. tall. The approximate dimensions for a 20,000 gallon tank may be, for example, about 65 ft.×8 ft.×8 ft. However, these dimensions may be varied in order to accommodate the location in which the system is to be placed.

The tank may be constructed of any material suitable for holding sewage materials, but is preferably constructed of concrete or fiberglass. Although the tank may be placed in any convenient location, preferably the tank is designed to be installed below ground. By providing a subterranean tank, the sewage is kept cooler, which helps the separation of oleaginous materials from the waste water and solids. However, this may be supplemented with a cooling system, if necessary, particularly if the tank is installed above ground.

Access to the tank may be provided by openings in the top, large enough for human access and covered by manhole covers. This allows access for maintenance and the removal of oleaginous materials. For the subterranean tanks, the openings may be through vertical shafts, for example made of concrete, metal, or fiberglass, that extend from the tank to the surface. The manhole covers may rest on inside flanges that prevent the covers from falling into the tank. Preferably, an opening is provided every 8 to 12 feet along the length of the tank. Normally, at least one opening is provided for each separate chamber of the tank, discussed in detail below.

THE CHAMBERS

The inside of the tank preferably includes multiple chambers. Two is often optimum. Where two chambers are provided, there is a first chamber, into which the inlet pipe extends, and a second chamber in flow communication with the first chamber. Although the chambers may be equal in size, it may be advantageous for the first chamber to be larger than the second chamber. In a preferred embodiment, the first chamber encompasses approximately $2/3$ to approximately $3/4$ of the total size (volume) of the tank. The first chamber may serve to reduce the velocity and turbulence of sewage entering the preloader system.

A portion of the floor of the first chamber may advantageously be sloped. The high point of the slope may begin at the wall in which the inlet pipe is positioned and may continue downward, away from the inlet pipe. Normally, the slope extends from the wall in which the inlet pipe is positioned toward the opposite wall, which may be a common wall between the first and second chambers. The grade of the slope may be about 0.25 inch per foot, for example, but may vary in accordance with local codes and design needs.

The first and second chambers may be separated by a common wall. The wall may be constructed of the same materials of which the tank is constructed. The wall may be the full height of the tank, completely separating the two chambers, but preferably it will extend to a distance from the ceiling of the tank in the range of about 1 to 3 inches. Preferably, the wall will be high enough to prevent materials in the first chamber from flowing over into the second chamber, but low enough to prevent a vacuum effect between the two chambers.

The first and second chambers may be in flow communication with one another through an opening in their common wall. The opening may be positioned at a height above the floor of the tank in the range of about $1/2$ to $2/3$ of the total height of the tank. A T-shaped separation pipe may be positioned in the opening to facilitate the flow communication. The height of the openings in the separation pipe may be positioned similarly to those of the inlet pipe. The substantially horizontal portion of the T-shaped pipe may extend from an opening in the vertical portion through the opening in the common wall.

The size of the separation pipe may be in the same range as the size of the inlet pipe. It also may be constructed using the same materials.

The T-shaped separation pipe preferably is constructed so as to prevent the flow of solids and oleaginous materials into the second chamber. In the first chamber substantial portions of the solids settle to the bottom of the chamber, while substantial portions of the oleaginous materials float to the surface of the sewage. The bottom opening of the T-shaped pipe preferably is high enough that solids will not become lodged in the pipe, but low enough that floating oleaginous materials will not enter the separation pipe. Being thus constructed, this pipe may allow water to rise through the opening in the bottom of the vertical portion of the pipe and flow into the second chamber through the substantially horizontal portion. The top opening of the vertical portion preferably is high enough that, when the level of sewage in the tank reaches its maximum, oleaginous materials will not flow into the top opening of the vertical portion and down the pipe.

Although a T-shaped pipe may be used to prevent the flow of oleaginous materials and solids into the second chamber, other known flow communication systems may be used to achieve the same end. For instance, a baffle wall and weir may be used. The baffle wall may extend from the ceiling of the tank down to a level at which the level of oleaginous materials is unlikely to fall below. The weir may be positioned downstream of the baffle wall and may extend up from the floor of the tank to a position higher than the lowest level of the baffle wall. Such a structure can function in the same manner as the T-shaped pipe.

The second chamber may be in the range of about ⅓ to ¼ the size of the first chamber, for example. The second chamber may also include a T-shaped outlet pipe serving as the discharge line and leading to a public sewer line, and eventually to the sewage treatment plant. The height of the openings in the outlet pipe may be positioned similarly to those of the inlet pipe and separation pipe. The substantially horizontal portion of the T-shaped outlet pipe may extend from an opening in the vertical portion through an opening in one wall of the second chamber, preferably the wall opposite the common wall. The opening through which the outlet pipe passes may advantageously be at an elevation that is about 2 to 4 inches below the inlet opening in the first chamber.

Being thus constructed, the second chamber outlet pipe also is preferably adapted to prevent the flow of oleaginous materials out of the tank, while allowing waste water to flow freely. Again, other known separation systems, such as baffle walls and weirs may be used to achieve the same result. The size of the outlet pipe may be in the same range as that of the inlet and separation pipes. Additionally, the outlet pipe may be constructed using the same materials as well.

With the above-discussed flow pattern through the tank, waste water may flow into the tank through the inlet pipe, through the separation pipe, and out through the outlet pipe by the force of gravity alone. The oleaginous materials and solids are preferably trapped within the tank, and thus, will likely not be discharged through the outlet line in any substantial quantity.

GRINDER PUMPS

The first chamber (as well as other chambers) may include one or more grinder pumps for grinding and pumping the solids. Preferably, an effluent-submersible grinder pump will be used. Preferably, the pump will be of a power in the range of about 1 to 4 horsepower. A grinder pump preferably is positioned on the floor of the first chamber, e.g., near the base of the sloping portion. If a plurality of pumps are used, they may be spaced out over the floor of the first chamber so as to most efficiently draw in and grind the solids that descend toward, or settle on, the floor. Normally, a grinder pump may draw in solids and liquids within the range of about 15 to 20 in. from the pump intake. The intake for the grinder pump is preferably at or near the bottom of the grinder pump. The pump may be elevated slightly from the floor of the chamber to provide a space into which solids may be drawn, preferably being elevated enough so that the pump does not draw in rocks or other heavy debris that may find its way into the tank. It is generally preferred that the inlet to the grinder pump be positioned at a height in the range from about 1 to 3 inches above the floor of the first chamber.

When operated, the grinder pumps may draw in liquids and solids near the pump's inlet, grind the solids, and then pump the resulting slurry through a line (grinder conduit) or lines connected to the pump. When a plurality of pumps are used, it is preferable to alternate their activation so that the pumps run one at a time, to prevent a power drain. The pumps may also include features that reduce the chance of burnout of the motors.

For instance, the pumps may be designed to automatically reverse the pumping and grinding action if materials get lodged in the grinder pump and inhibit the grinding process.

The grinder conduit attached to the grinder pump may extend from the pump and carry the slurry of ground solids to a discharge line (which may be one and the same with the outlet line) where the slurry may be mixed with the waste water exiting the tank. The conduit may be made of any durable material, but is preferably PVC or other plastic tubing.

The grinder conduit may extend from the grinder pump upwards to a height above that of a terminal opening in the grinder conduit to which the discharge line is connected. Most preferably, the grinder conduit may extend vertically upward through the ceiling of the tank, run horizontally above the tank, and then slope downward and connect to the discharge line. The cross-sectional area of the grinder conduit may vary as it extends from the grinder pump to the discharge line. Preferably, the conduit may have a larger cross-sectional area in the section or sections closer to the discharge line than in those portions that are closer to the grinder pump. In other words, the cross-sectional area of the conduit preferably increases in the direction from the grinder pump to the discharge line. The grinder conduit may vary in its cross-sectional area in a range from about 3 to 80 square inches. Preferably, the grinder conduit will have an upstream section, including the entire vertically oriented portion of the conduit, and a downstream section that has a larger cross-sectional area than the upstream section of the grinder conduit. The two sections may be attached to one another by an expanding portion (transitional segment) that is adapted to fit the cross-sectional areas of both sections.

The widening of the grinder conduit from the grinder pump to the opening in the discharge line provides an increasing amount of flow area for the same amount of fluid. This reduces the head pressure and velocity in the grinder conduit. By providing this feature after the conduit reaches a height greater than the opening and/or the outlet pipe in the second chamber back into the discharge line, the flow pressure may easily return to that of gravity flow.

THE REMOVAL OF OLEAGINOUS MATERIALS

Preferably, the oleaginous materials (or portions thereof) rise to the surface of the sewage in the first chamber (although oleaginous materials may also separate and rise to the surface in the second chamber). The oleaginous materials may be periodically removed. This may be done by any conventional means, including skimmers, oleophilic discs and manual removal. When dealing with large volumes of oleaginous materials, it is preferable to manually remove the oleaginous materials by way of a liquid suction line lowered into the tank. The suction line may convey the oleaginous materials into a separate tank or disposal truck for disposal at a later time.

PRESSURE RELIEF LINE

The pressure relief line allows head pressure to release from the grinder conduit, back into the tank. It is preferred that the pressure relief line connect to the grinder conduit at a point in the conduit that is downstream of the grinder conduit's highest elevation. Most preferably, the pressure relief line connects to the grinder conduit at a point where the grinder conduit has a greater cross-sectional area than at upstream portions thereof.

The opening from the grinder conduit to the pressure relief line may have the same cross-sectional area as the grinder conduit. The relief line may be positioned on the side of the grinder conduit, but preferably above (if only slightly) the elevation of the lowest point of the conduit at the point of connection.

Although the pressure relief line may follow any path back to the tank, it is preferable that the pressure relief line extend to a height above the highest point of the grinder conduit before opening into the tank. Also, the pressure relief line may extend from the grinder conduit in an upstream direction with respect to the flow of the slurry in the grinder conduit.

When the discharge line or public sewer line becomes backed up, the pressure relief line can allow the slurry of solids to be discharged back into the tank rather than being forced downstream towards the blockage, increasing the pressure in the line.

SPRAY SYSTEM

The present system also may include a spray system for spraying waste water from the second chamber down onto the oleaginous materials floating in the first chamber to dislodge at least some of the solids that may be trapped in the oleaginous materials, so that they can descend and be pulled into the grinder. By doing so, the system may more fully separate the sewage materials. Also, by recycling the waste water in the tank for use in the spray system, the preloader system may avoid an additional hydraulic pressure load that could be caused if water from an outside source is sprayed over the sewage.

Preferably, the spray system will include a submersible pump in the second chamber, used for pumping waste water back into the first chamber and spraying it over the oleaginous materials floating therein. Any commercially available submersible pump may be used for the spray pump. Preferably, the pump may be in the range from about 1.5 to 3 horsepower. Similarly to the grinder pump, the spray pump may advantageously be elevated in the range from about 1 to 3 in. above the floor of the second chamber so that the intake opening in the spray pump, which may be close to the bottom thereof, may draw in waste water but not debris that may have settled on the floor of the chamber.

A spray line may be connected to the spray pump to receive the pumped waste water, which then may be directed through the spray line back into the first chamber. The spray line may be constructed of any durable material, but is preferably made of PVC or other plastic tubing. The cross-sectional area of the spray line may be in the range from about 0.78 to 13 square inches. The spray line may extend vertically upward from the spray pump to near the ceiling of the tank and then may extend along the ceiling over or through the common wall and into the first chamber. Preferably, the spray lines are suspended or positioned along an upper portion of the tank.

In the first chamber, the spray line may continue along the ceiling of the tank for the entire length of the first chamber. The spray line may also be divided into a plurality of lines so as to branch out over many portions of the tank. Openings may be provided in the spray line (or lines) through which the pumped waste water may be forced out over the floating oleaginous materials. These openings may be provided with nozzles or other fixtures to cause the pumped water to be sprayed down over the oleaginous materials with increased force. The openings or nozzles may have diameters in the range of about 0.06 to 2.0 in.

In some embodiments of the present invention, it is possible to use the spray system without the pressure relief line.

SENSOR SYSTEM

Preferably, the present system is also equipped to discharge the sewage gradually over the day, rather than activated more often during peak times. This may be achieved by using a combination of timers and sensors to control the grinder pumps. Using timers alone could cause the grinder pumps to activate when insufficient amounts of solids or waste water are in the tank, which in turn could burn out the pump motors or cause oleaginous materials to be pumped out of the tank into the sewer lines. Accordingly, the system of the present invention preferably includes sensors for detecting the levels of oleaginous materials, waste water and solids, and that provide that information to a control system that deactivates the pumps when the amount of sewage solids in the tank is insufficient to properly run the grinder pump or pumps.

Preferably, the first chamber may include sensors for detecting the levels of waste water and oleaginous materials and the amount of solids. The sensors may be provided to measure only one of these levels, or a plurality of sensors may be provided to measure the levels of different materials and at different heights. Any known sensors may be used to detect these levels, such as floats; however, conductivity probes are used in preferred embodiments.

In preferred embodiments, a plurality of conductivity probes may be provided at different heights within the first chamber. Each probe may detect the conductivity of the environment surrounding the probe, and thus, it may be determined whether there is oleaginous materials, or solids at that height, and, to some extent, at what density. By providing a plurality of probes at different heights, the type of sewage material at each level may be determined.

The conductivity probes may advantageously take the form of rods (e.g., titanium rods) that extend from the top of the tank with their bottom tips positioned at different heights within the first chamber. Such probes can be very sensitive to changes in the electrical conductivity of the material surrounding the rod tip. The more suspended solids in the water, the lower the conductivity. Also, the greater the concentration of oleaginous materials, the lower the conductivity (as compared to clear water). In this way, the conductivity probes can be used to measure the density of suspended solids or oleaginous materials at the particular depth at which the probe is set.

Preferably, at least three conductivity probes are provided in the first chamber. A first probe may be provided at a height from the floor of the tank in the range of about ⅔ to ¾ the total height of the tank. The second probe may be provided at a height from the floor of the first chamber in the range of about ⅓ to ⅔ the total height of the tank. The third probe may be provided at a height in the range of about 0.5 to 2.0 in. above the floor of the tank. The probes may detect the conductivity of any of the sewage materials which may surround the probe; however, the probes are preferably positioned at particular heights so that they will more likely detect one of the sewage types. The first probe may be used to detect the level of the oleaginous materials floating at the top of the sewage (or the waste water). The second probe may be used to measure the water level (or the level of oleaginous materials). If this level falls below the second probe, such that oleaginous materials or air surrounds the second probe, the probe may detect a decrease in the conductivity. The third probe may be positioned to detect the amount of solids on the floor of the first chamber. If the level of solids drops below the position of the third probe, that area will be taken up by the waste water, and the probe may detect an increase in conductivity, and vice versa if the solids rise above the probe.

The information obtained from the probes may be provided to a CPU (central processing unit), which may control the grinder pumps and spray pumps. Accordingly, the CPU may control the pumps to deactivate when any of the detected levels of sewage fall below or rise above any of the predetermined probe heights. If the amount of solids at the bottom of the chamber becomes low, the CPU may deactivate the grinder pumps so as not to burn out the motors or pump needlessly. Alternatively, the pumps may be activated if too many solids settle on the floor of the tank. If the second probe detects that the sewage level has fallen below the probe, the CPU may deactivate the grinder pumps to prevent the waste water from dissipating enough to affect the ability of the grinder pumps to create the slurry. This also prevents the sewage level from dropping to a level at which the oleaginous materials can enter the separation pipe. When the first probe detects that the level of sewage has risen above or to the height of the first probe, the CPU may activate the grinder pumps so as to prevent the level of sewage from rising further.

The CPU may control the activation and deactivation of the grinder pump solely on the basis of the information from the conductivity probes. However, in other embodiments, the CPU may be programmed to activate and deactivate the grinder pumps on the basis of other information, for instance cues provided by a computerized timer. Preferably, the CPU activates and deactivates the grinder pumps based on timers which activate the grinder pumps throughout each day to provide an even dispersement of ground solids, avoiding peak time surges. In this arrangement, the sensors may provide information that the CPU may use to override activation or deactivation signals from the timers.

The timers may be 7-day, 24-hour, 2-channel, programmable timers. The on/off times may be adjustable for cycle time and frequency. The duration of pumping may be controlled to correspond to the load of the tank, and may be set according to each application. The timer system may also control an alternating relay to initiate activation of alternate pumps with each activation cycle.

In some embodiments of the present invention, it is possible to use this sensor system without the pressure relief line.

FLOAT SENSOR SYSTEM

A sensor, or sensors, may be provided in the second chamber to measure sewage levels. Again, any conventional sensor system may be used to measure the level of sewage. Although the conductivity probe system discussed above may be used, it is preferable to use a simpler system for the second chamber.

In one embodiment, a float system is provided in the second chamber to measure the sewage level. The system may include a pole provided between the floor and ceiling of the second chamber to which is connected a float sensor. The float sensor may float on the surface of the sewage as the sewage level rises and falls. If the fluid level rises past a predetermined height, a cord or the like connecting the float sensor to the pole may prevent the float sensor from floating any higher. This may cause the float to be pulled beneath the surface. Preferably, as the float sensor is pulled beneath the surface it inverts.

Inside the float sensor may be provided a length of pipe or tubing with a metal ball or bearing provided therein. As the float rests on the surface of the sewage, the ball or bearing may settle to the bottom of the float housing, which may be provided in a substantially vertical position. As the float sensor inverts when the water level rises above the predetermined height, the float housing may tilt toward and then past a horizontal position. This can cause the metal ball to roll from the bottom to the top of the float housing, where it contacts wiring to complete a circuit. When the circuit is completed, the CPU may be alerted to the increased sewage level in the second chamber, setting off an audible and visual alarm.

Thus constructed, the float system in the second chamber may alert the CPU to possible downstream blockages. The CPU may be programmed to control the pumps based on this alert. The CPU may also alert an operator to the increased sewage level through an alarm system, so that workers may attend to any problems.

Figure 1:
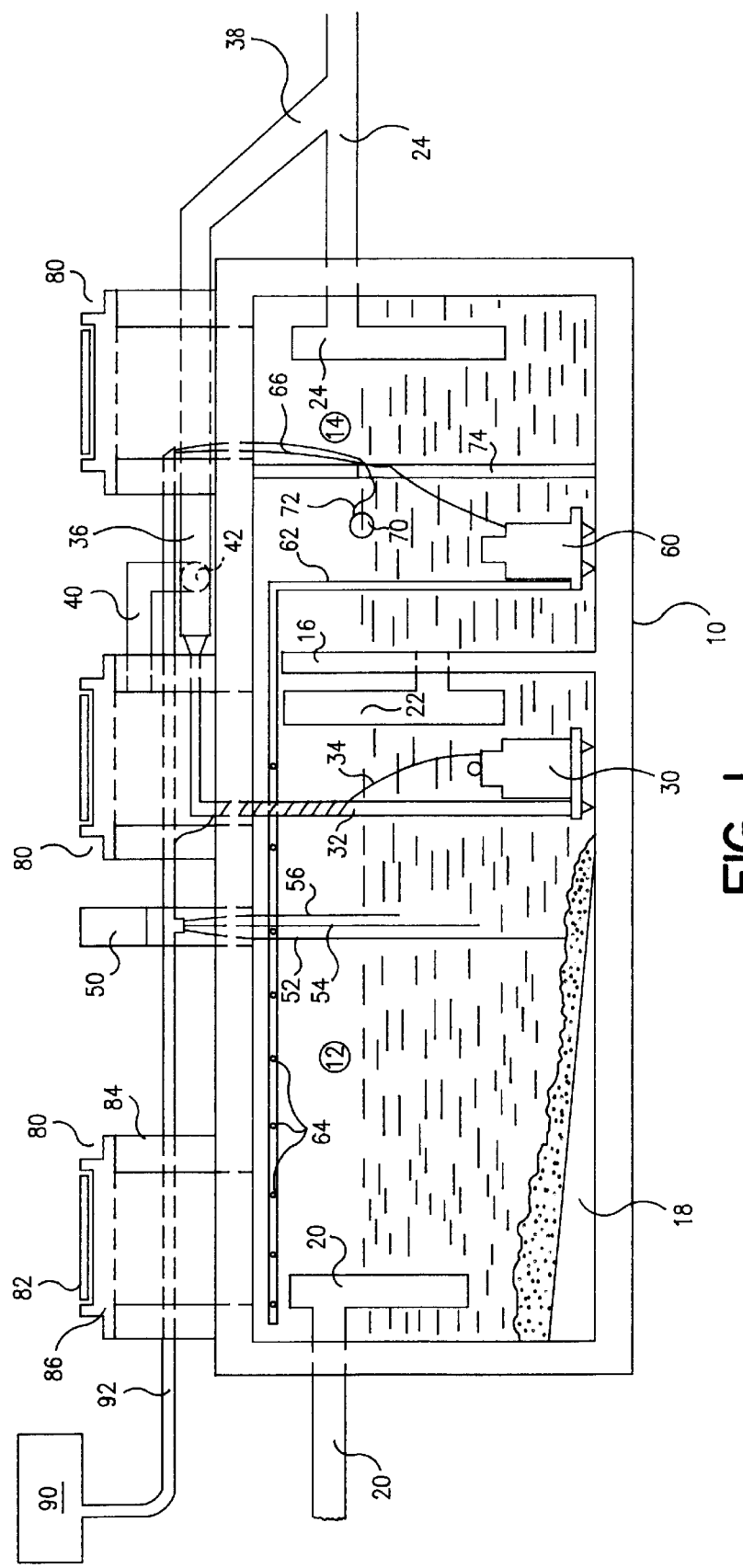
FIG. 1 is a side view of one embodiment of the preloader system of the present invention.

Referring to the drawings, the illustrative system includes a tank 10, which receives raw sewage through a T-shaped inlet pipe 20. The inlet pipe 20 includes a horizontal portion and a vertical portion, the latter of which has openings in the top and bottom that allow the sewage to flow into the tank. Specifically, the sewage flows into a first chamber 12 of the tank 10.

In the first chamber 12 oleaginous materials float to the surface of the sewage, while solids sink to the floor of the first chamber 12. The floor of the first chamber 12 includes a sloped portion 18, along which the solids may slide downward and away from the inlet pipe 20.

At the base of the sloped portion 18 there is provided a grinder pump 30. The grinder pump 30 draws in solids and liquids from within the chamber 12 and grinds them into a slurry. The slurry is pumped through a grinder conduit 32. The grinder conduit 32 extends vertically up through the chamber 12 and then horizontally above the tank 10. After extending past the tank 10, the grinder conduit 32 slopes downward and connects at an opening 38 to a discharge pipe 24. The grinder conduit 32 includes an enlarged section 36 along a downstream length thereof.

Connected to the enlarged portion 36 of the grinder conduit 32 is a pressure relief line 40. The pressure relief line is connected to the side of the enlarged section 36 at opening 42. At the end of the pressure relief line opposite the opening 42 is an opening that allows head pressure to release into the first chamber 12.

A sensor system 50 is provided on top of the tank 10. The sensor system 50 includes a first probe 52, second probe 54 and third probe 56, each of which comprises a length of rod suspended from the sensor system 50 down into the first chamber 12. The probes measure the electric conductivity of the matter within the proximity of the tip of each probe. The first probe 52 is suspended at a height near the sloped portion 18 of the floor of the tank 10. The second probe 54 is suspended about ½ of the distance from the ceiling to the floor of the tank 10. This height is above a bottom opening of a T-shaped separation pipe 22. The third probe 56 is suspended at a height above both the first and second probes.

Figure 2:
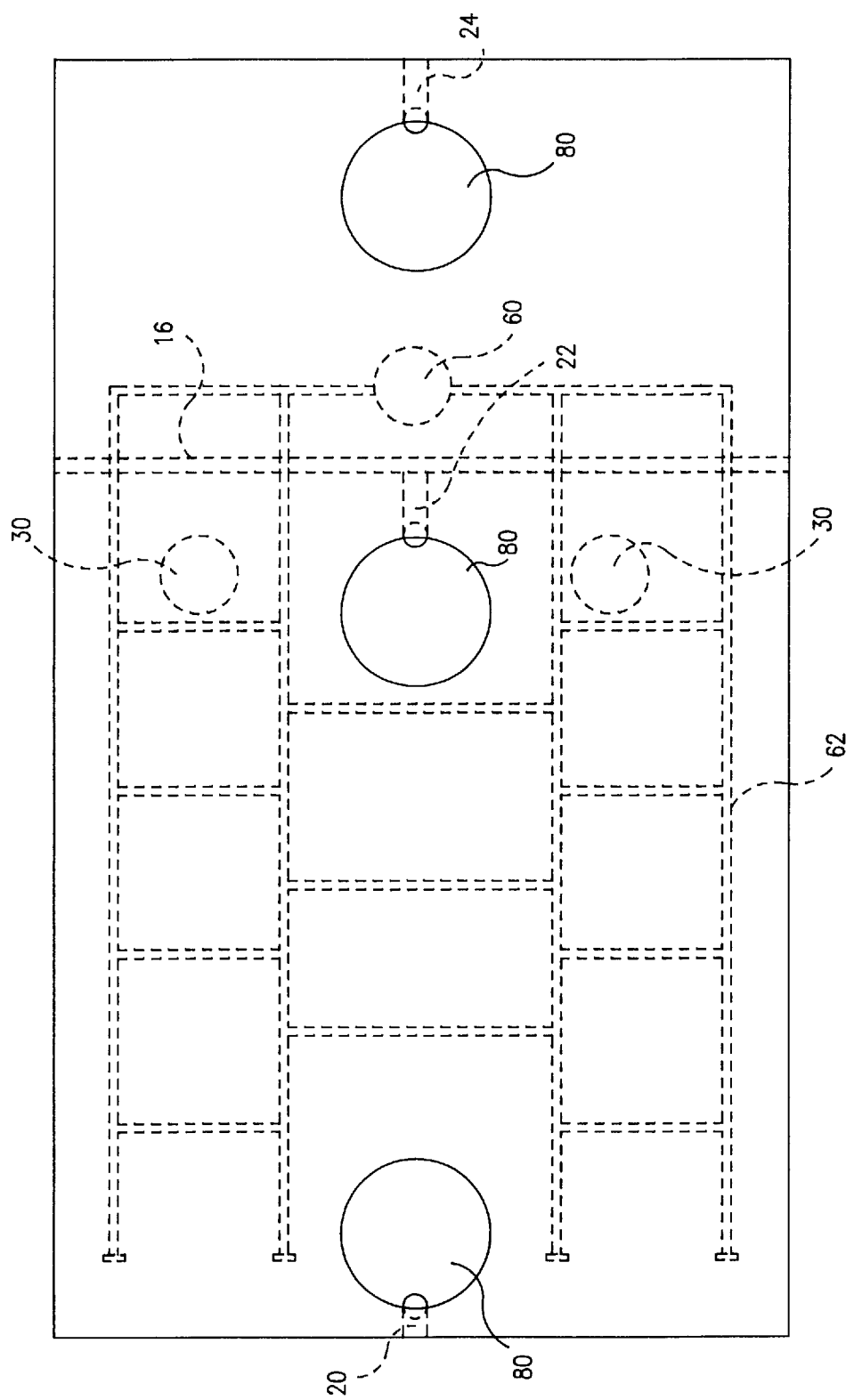
FIG. 2 is a top view of the preloader system shown in FIG. 1.

The first chamber 12 is in flow communication with a second chamber 14 of the tank 10 through the T-shaped separation pipe 22. The separation pipe 22 includes openings at the top and bottom of the vertical portion thereof. The horizontal portion of separation pipe 22 extends through a common wall 16 into the second chamber 14. Flow communication is provided between the first chamber 12 and second chamber 14 through the bottom opening and horizontal portion of the separation pipe 22. As shown in FIG. 2, the separation wall 16 traverses the entire width of the tank 10. However, as seen in FIG. 1, the separation wall 16 does not extend all the way to the top of the tank 10.

The second chamber 14 also includes the T-shaped discharge pipe 24 that extends through a side wall of the second chamber 14 before connecting with the grinder conduit 36 at opening 38. The discharge pipe 24 is constructed similarly to the other T-shaped pipes. However, it should be noted that the horizontal portion of the discharge pipe 24 passes through the side wall of the tank 10 at a height below that which the inlet pipe 20 passes through the side wall of the chamber 12, and above the height at which the separation pipe 22 passes through the common wall 16.

A submersible spray pump 60 is provided in the second chamber 14. The spray pump 60 pumps waste water from the second chamber 14 through the spray line 62. The spray line 62 extends vertically up towards the ceiling of the second chamber 14 and horizontally over the common wall 16 into the first chamber 12. Provided along the length of the spray line 62 within the first chamber 12 are nozzles 64. The waste water pumped from the second chamber 14 through the spray line 62 is sprayed over the oleaginous material floating on top of the sewage in the first chamber through the nozzles 64.

The second chamber 14 also includes a sensor system including a float sensor 70, a cord 72 and a float pole 74. The float pole 74 extends between the floor and ceiling of the second chamber 14. The cord 72 is attached at one end to the float pole 74, and at the other end to the float sensor 70. The cord 72 prevents the float sensor 70 from floating above a predetermined height within the second chamber 14. This predetermined height is set by the length of the cord 72 and the point of attachment to the float pole 74.

Access is provided to the tank 10 through extended openings 80. Three of the extended openings 80 are provided along the length of the tank 10 as shown in FIGS. 1 and 2. The openings 80 include extension portions 84 extending from the top of the tank to cover portions 86. The cover portions 86 are closed by removable lids 82.

A CPU 90 controls the activation and deactivation of the grinder pumps 30 and spray pump 60. The CPU 90 receives data from the probe sensor system 50 and the float sensor 70. The CPU is connected to the sensor systems and pumps through wires in a wire conduit 92. A wire 34 extends from the grinder pump 30 through the wire conduit 92 to the CPU. A wire 66 extends from the spray pump 60 through wire conduit 92 to the CPU 90. The cord 72 is provided with a wire that extends from the float sensor 70 through the wire conduit 92 to the CPU 90. Additionally, the wires connected with probes 52, 54 and 56 also extend through the wire conduit 92 to the CPU 90.

I claim:

1. In a sewage separation system comprising:
    a chamber for receiving sewage containing water, oleaginous materials and solids, in which at least a portion of the solids can settle to the bottom of the chamber and at least a portion of the oleaginous materials can rise to the top of the water;
    a discharge line for passing sewage from said sewage separation system into a transport line, separate from said chamber, that leads to a sewage treatment plant that is separate from the sewage separation system;
    means for grinding at least a portion of the solids that settle to the bottom of said chamber;
    a conduit for conducting a slurry of the ground solids in water from said chamber to said discharge line, said conduit having a terminal opening where it is connected to said discharge line; and
    means for preventing at least a portion of the oleaginous materials in said sewage separation system from entering said discharge line;
    the IMPROVEMENT wherein said system includes a pressure relief line, running from said conduit, that allows head pressure to be released into said chamber, said pressure relief line having an inlet opening where it is connected to said conduit, and said pressure relief line being connected to said conduit downstream of said conduit's point of highest elevation.

2. The system of claim 1, further comprising pumping means for pumping the slurry of ground solids from said chamber through said conduit.

3. The system of claim 2, wherein at least one portion of said conduit is at a higher elevation than said terminal opening of said conduit, and said inlet opening of said pressure relief line is positioned in that portion of said conduit.

4. The system of claim 3, wherein (a) said conduit is comprised of an upstream length and a downstream length, wherein said downstream length ends in said terminal opening, (b) said upstream length has an average cross-sectional area smaller than the average cross-sectional area of said downstream length and (c) said lengths are joined by a transitional segment of said conduit that is at a higher elevation than said terminal opening of said conduit.

5. The system of claim 4, wherein said pressure relief line connects to said conduit at a location in said downstream length.

6. The system of claim 5, wherein at least one portion of said pressure relief line is at a higher elevation than the highest point of said conduit.

7. The system of claim 1, further comprising a second chamber, in flow communication with said first chamber, for receiving sewage water from said first chamber and allowing at least a portion of any oleaginous materials therein to rise to the top of the water, wherein said discharge line passes sewage water from said second chamber into said transport line.

8. The system of claim 7, further comprising means for withdrawing water from said second chamber and spraying the water downwardly onto oleaginous materials floating on the sewage water in said first chamber under sufficient force to cause at least a portion of any solids lodged in the oleaginous materials to be dislodged and allowed to descend toward the bottom of said first chamber.

9. The system of claim 8, wherein said withdrawing and spraying means includes a pump and a plurality of branched lines, having spray openings, suspended in an upper portion of said first chamber.

10. The system of claim 1, further comprising first means for detecting the level of sewage in said chamber, and controlling means responsive to said first sewage level detecting means for deactivating said grinding means when the sewage level drops below a preset minimum.

11. The system of claim 10, further comprising means for detecting the amount of solids in said chamber, wherein said controlling means is also responsive to said solids amount detecting means and controls said grinding means based on the detection from said solids amount detecting means.

12. The system of claim 11, further comprising second means for detecting the level of sewage in said chamber, wherein said controlling means is also responsive to said second sewage level detecting means and activates said grinding means when the level of sewage rises above a preset maximum.

13. The system of claim 12, wherein each of said detecting means for detecting the levels of sewage and the amount of solids comprises a conductivity probe located in said first chamber.

14. The system of claim 13, wherein said second sewage level detecting means is located at a first height, said first sewage level detecting means is located at a second height, lower than the first height, and said solids amount detecting means is located at a third height, lower than the second height.

15. In a sewage separation system comprising:
   a first chamber for receiving sewage containing water, oleaginous materials and solids, in which at least a portion of the solids can settle to the bottom of the chamber and at least a portion of the oleaginous materials can rise to the top of the water;
   a second chamber, in flow communication with said first chamber, for receiving the sewage from said first chamber and allowing at least a portion of the oleaginous materials to rise to the top of the water;
   a discharge line for passing sewage from said second chamber into a transport line, separate from chambers that leads to a sewage treatment plant that is separate from the sewage separation system;
   means for grinding at least a portion of the solids that descend toward the bottom of said first chamber;
   a conduit for conducting a slurry of the ground solids in water from said first chamber to said discharge line, said conduit having a terminal opening where it is connected to said discharge line; and
   means for preventing at least a portion of the oleaginous materials in said sewage separation system from entering said discharge line;
   the IMPROVEMENT wherein said system includes a pressure relief line running from said conduit, said line being in communication with said first chamber and allowing head pressure to be released into said first chamber, said pressure relief line having an inlet opening where it is connected to said conduit, and said pressure relief line being connected to said conduit downstream of said conduit's highest point of elevation.

16. The system of claim 15, further comprising means for detecting the presence of any one of waste water, oleaginous materials, and solids at different levels in said first chamber.

17. The system of claim 16, wherein the transport line that leads to a sewage treatment plant is a gravity flow transport line.

18. The system of claim 16, further comprising means for withdrawing water from said second chamber and spraying the water downwardly onto the contents of said first chamber under sufficient force to cause at least a portion of any solids lodged in oleaginous materials on top of the water to be dislodged and allowed to descend toward the bottom of said first chamber.

19. The system of claim 18, wherein the transport line that leads to a sewage treatment plant is a gravity flow transport line.

20. The system of claim 15, further comprising pumping means for pumping the slurry of ground solids from said first chamber through said conduit.

21. The system of claim 20, wherein the transport line that leads to a sewage treatment plant is a gravity flow transport line.

22. The system of claim 20, wherein at least one portion of said conduit is at a higher elevation than said terminal opening of said conduit, and said inlet opening of said pressure relief line is positioned in that portion of said conduit.

23. The system of claim 22, wherein the transport line that leads to a sewage treatment plant is a gravity flow transport line.

24. The system of claim 22, wherein (a) said conduit is comprised of an upstream length and a downstream length, wherein said downstream length ends in said terminal opening, (b) said upstream length has an average cross-sectional area smaller than the average cross-sectional area of said downstream length, and (c) said lengths are joined by a transitional segment of said conduit that is at a higher elevation than said terminal opening of said conduit.

25. The system of claim 24, wherein the transport line that leads to a sewage treatment plant is a gravity flow transport line.

26. The system of claim 15, wherein the transport line that leads to a sewage treatment plant is a gravity flow transport line.

27. In a sewage separation system comprising:
   a chamber for receiving sewage containing water, oleaginous materials and solids, in which at least a portion of the solids can settle to the bottom of the chamber and at least a portion of the oleaginous materials can rise to the top of the water;
   a discharge line for passing sewage from said sewage separation system into a gravity flow transport line, separate from said chamber, that leads to a sewage treatment plant that is separate from the sewage separation system;
   means for grinding at least a portion of the solids that settle to the bottom of said chamber;
   a conduit for conducting a slurry of the ground solids in water from said chamber to said discharge line, said conduit having a terminal opening where it is connected to said discharge line; and means for preventing at least a portion of the oleaginous materials in said sewage separation system from entering said discharge line;
   the IMPROVEMENT wherein said system includes a pressure relief line, running from said conduit, that allows head pressure to be released into said chamber, said pressure relief line having an inlet opening where it is connected to said conduit, and said pressure relief line being connected to said conduit downstream of said conduit's highest point of elevation.

28. The system of claim 27, further comprising pumping means for pumping the slurry of ground solids from said chamber through said conduit.

29. The system of claim 28, wherein at least a one portion of said conduit is at a higher elevation than said terminal opening of said conduit, and said inlet opening of said pressure relief line is positioned in that portion of said conduit.

30. The system of claim 29, wherein (a) said conduit is comprised of an upstream length and a downstream length, wherein said downstream length ends in said terminal opening, (b) said upstream length has an average cross sectional area smaller than the average cross-sectional area of said downstream length and (c) said lengths are joined by a transitional segment of said conduit that is at a higher elevation than said terminal opening of said conduit.

31. The system of claim 30, wherein said pressure relief line connects to said conduit at a location in said downstream length.

32. The system of claim 31, wherein at least one portion of said pressure relief line is at a higher elevation than the highest point of said conduit.

33. In a sewage separation system comprising:

a chamber for receiving sewage containing water, oleaginous materials and solids, in which at least a portion of the solids can settle to the bottom of said chamber and at least a portion of the oleaginous materials can rise to the top of the water;

a discharge line for passing sewage from said sewage separation system into a transport line, separate from said chamber, that leads to a sewage treatment plant that is separate from the sewage separation system;

means for grinding at least a portion of the solids that settle to the bottom of said chamber; and a conduit for conducting a slurry of the ground solids in water from said chamber to said discharge line, said conduit having a terminal opening where it is connected to said discharge line; and wherein at least a portion of the oleaginous materials in said sewage separation system is prevented from entering said discharge line;

the IMPROVEMENT wherein said system includes a pressure relief line, running from said conduit, that allows head pressure to be released into said chamber, said pressure relief line having an inlet opening where it is connected to said conduit, with at least a portion of said pressure relief line being at a higher elevation than the highest point of said conduit, and said pressure relief line being connected to said conduit downstream of said conduit's highest point of elevation.

\* \* \* \* \*